US012655291B2

(12) United States Patent
Liu et al.

(10) Patent No.: US 12,655,291 B2
(45) Date of Patent: Jun. 16, 2026

(54) THERMOPLASTIC COMPOSITION FOR MONOLAYER TUBE, AIR-CONDITIONING CIRCUIT AND METHOD FOR PREPARING THE COMPOSITION

(71) Applicant: HUTCHINSON, Paris (FR)

(72) Inventors: Xin Liu, Paris (FR); Boris Hanoy, Paris (FR)

(73) Assignee: Hutchinson, Paris (FR)

( * ) Notice: Subject to any disclaimer, the term of this patent is extended or adjusted under 35 U.S.C. 154(b) by 835 days.

(21) Appl. No.: 17/786,781

(22) PCT Filed: Dec. 15, 2020

(86) PCT No.: PCT/EP2020/086303
§ 371 (c)(1),
(2) Date: Jun. 17, 2022

(87) PCT Pub. No.: WO2021/122656
PCT Pub. Date: Jun. 24, 2021

(65) Prior Publication Data

US 2023/0045963 A1 Feb. 16, 2023

(30) Foreign Application Priority Data

Dec. 20, 2019 (EP) .................................... 19306714

(51) Int. Cl.
*C08L 77/06* (2006.01)

(52) U.S. Cl.
CPC ........... *C08L 77/06* (2013.01); *C08L 2205/03* (2013.01)

(58) Field of Classification Search
CPC ...... C08L 2205/03; C08L 23/04; C08L 77/00; C08L 77/06; C08L 77/10; C08L 67/00; C08L 23/025; C08L 23/10; C08L 23/16; C08L 23/18; C08L 51/00; C08L 23/0869; C08L 23/0884; B29D 1/00; C08G 69/265; C08G 69/36; C09K 5/045; F25B 1/00; F25B 2341/0683; F28F 1/00; F28F 21/06
See application file for complete search history.

(56) References Cited

U.S. PATENT DOCUMENTS

| | | | | |
|---|---|---|---|---|
| 2014/0246096 A1* | 9/2014 | Blondel | B32B 27/308 | 524/514 |
| 2014/0296385 A1 | 10/2014 | Blondel et al. | | |
| 2016/0102202 A1 | 4/2016 | Lamberts et al. | | |
| 2019/0178423 A1 | 6/2019 | Blondel et al. | | |

OTHER PUBLICATIONS

The International Search Report and Written Opinion, mailed on Mar. 9, 2021, in the corresponding PCT Appl. No. PCT/EP2020/086303.

* cited by examiner

*Primary Examiner* — Ana L. Woodward

(57) ABSTRACT

The invention relates to a thermoplastic composition for a monolayer tube (T1, T2), and particularly to an air-conditioning circuit for a motor vehicle comprising tubes transporting a refrigerating fluid.

The composition comprises in weight fractions:

- more than 20% and up to 40% of a PA 6.10 and/or a PA 6.12,
- from 45% to less than 60% of a polyphthalamide having a Tg higher than 120° C. and selected from PA 6.I/6.T, PA 9.T, PA 10.T, PA 10.T/X, and
- from 10% to 20% of a compatibilizing system comprising a reaction product between (a) a polymer of olefin comprising an unsaturated epoxide and (b) a polymer of olefin comprising an unsaturated carboxylic acid, with weight ratio (a):(b) greater than 1.

20 Claims, 3 Drawing Sheets

[Fig. 1]
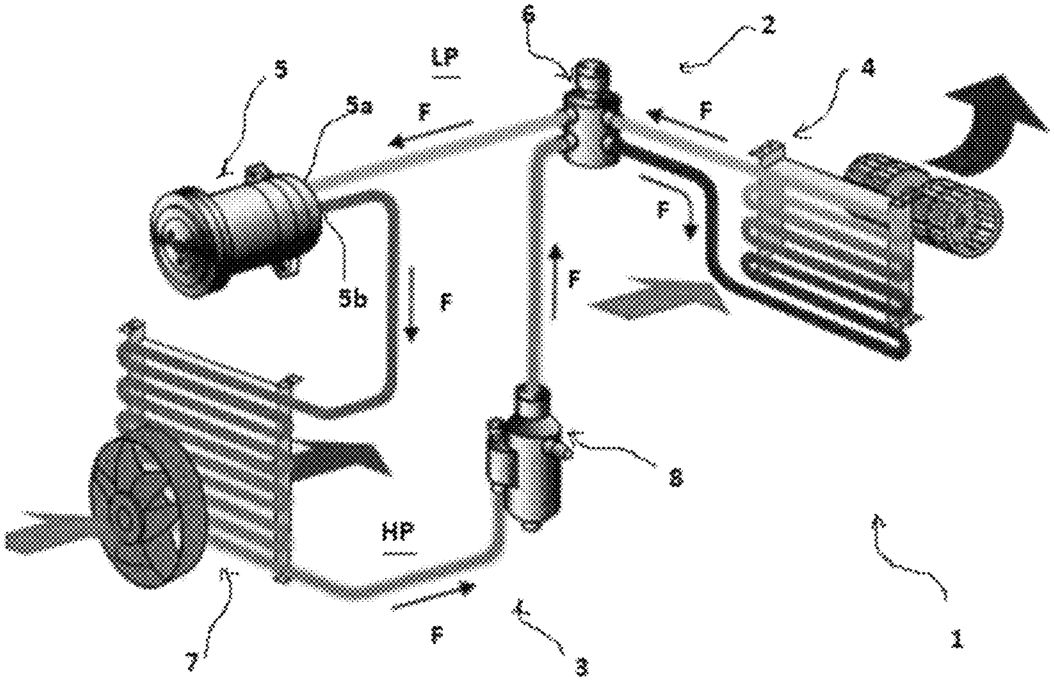
[Fig. 2]
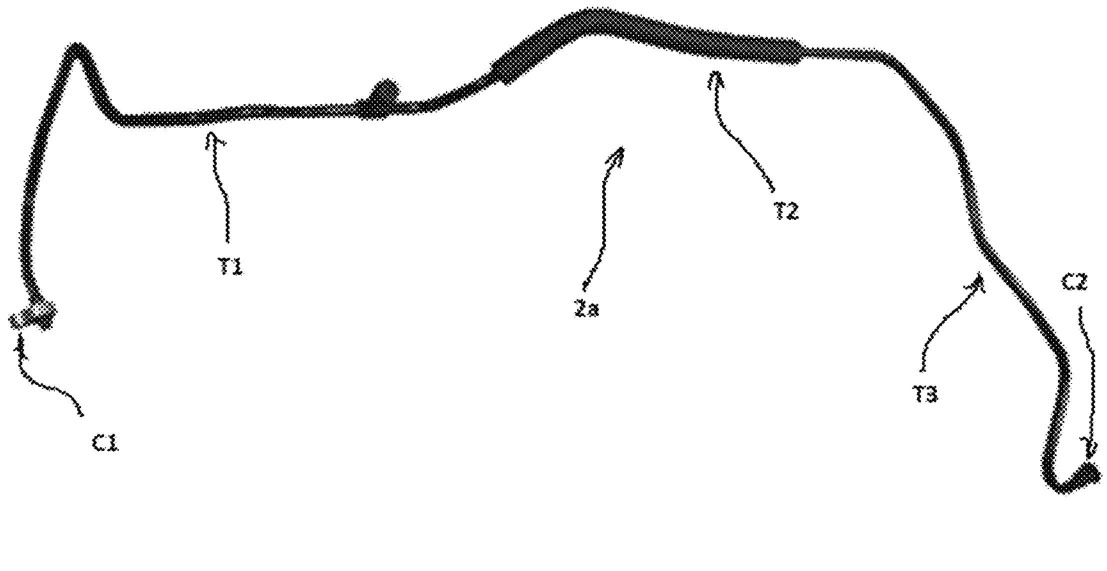

[Fig. 3]
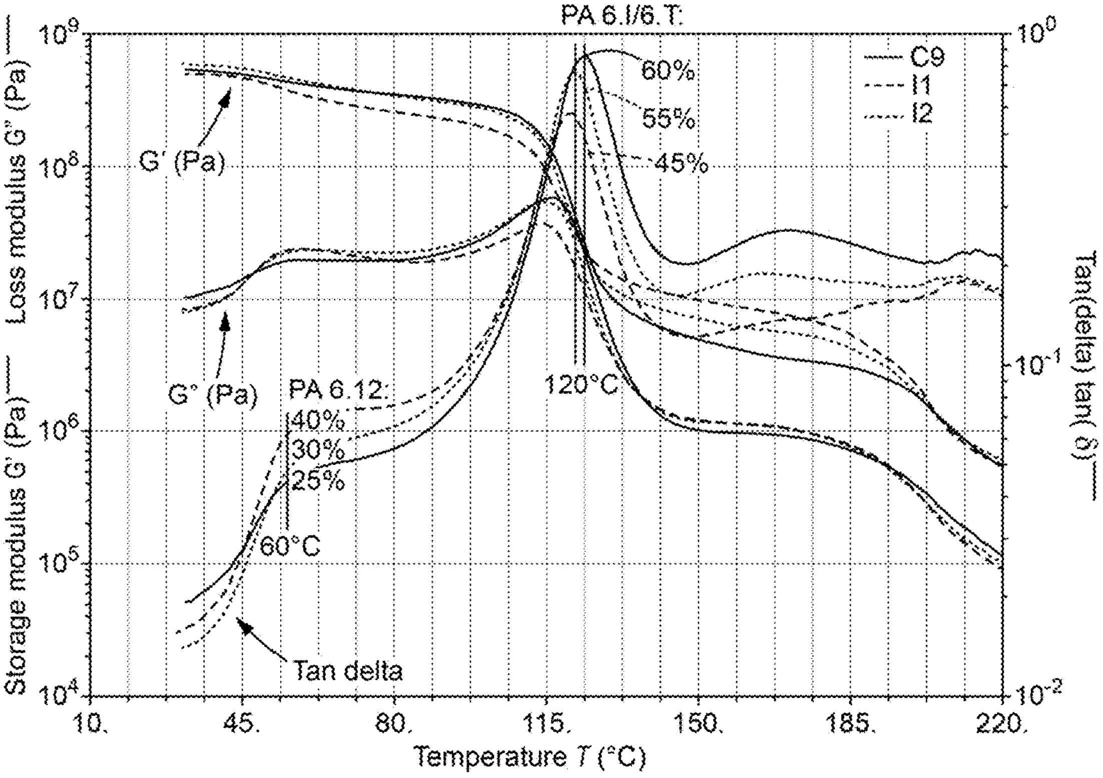

[Fig. 4]
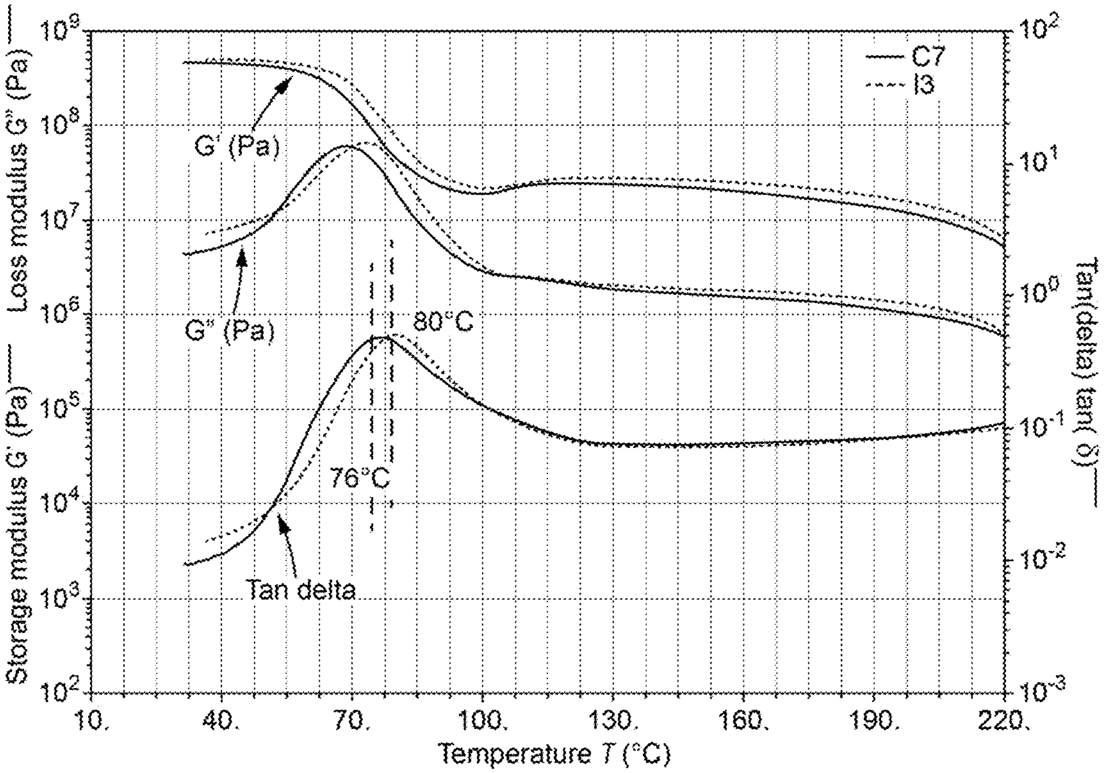

THERMOPLASTIC COMPOSITION FOR MONOLAYER TUBE, AIR-CONDITIONING CIRCUIT AND METHOD FOR PREPARING THE COMPOSITION

CROSS-REFERENCE TO RELATED APPLICATIONS

This application is a National Stage Application of PCT/EP2020/086303 filed Dec. 15, 2020, which claims priority from European Patent Application No. 19306714.7, filed on Dec. 20, 2019. The priority of said PCT and European Patent Application is claimed. Each of the prior mentioned applications is hereby incorporated by reference herein in its entirety.

FIELD OF THE INVENTION

The invention relates to a thermoplastic composition capable of forming a monolayer tube for transporting a fluid, this monolayer tube, an air-conditioning circuit for a motor vehicle comprising a plurality of tubes adapted to transport a refrigerating fluid, and a method for preparing the thermoplastic composition. The invention particularly concerns a monolayer thermoplastic tube adapted for transporting a refrigerant gas in a low-pressure loop of an air-conditioning circuit of a motor vehicle such as a motorcar, even though the invention generally applies to any thermoplastic monolayer tube transporting any kind of fluid (e.g. gaseous, liquid or even supercritical fluid) in lines involving requirements against gas and/or water permeation, such as in air or fuel lines, for instance.

BACKGROUND

In a known manner, a common air-conditioning circuit for a motor car essentially comprises a low-pressure loop for a gaseous refrigerant fluid (e.g. of Freon® type, such as R-1234yf or R-134a) between an evaporator and blower assembly and a compressor inlet, and a high-pressure loop between the compressor outlet and an expansion valve, between which are provided in succession a condenser and fan assembly and a drier. Both loops each comprise a line made of an assembly of plurality of multilayer rubber hoses and rigid metallic connecting tubings (e.g. of aluminum) connected together in succession typically by brazing and crimping.

Both lines of this air-conditioning circuit must fulfill strict requirements, markedly including:

- non-permeability and chemical resistance to the refrigerant fluid being transported and also to water,
- sufficient mechanical resistance while being nonetheless flexible enough, and
- satisfactory heat resistance due to high temperatures in the environment, which heat resistance may typically be illustrated by a thermal ageing of about 168 hours at 150° C. and by an ageing to Freon® type refrigerating fluids of about 2000 hours at 110° C.

Attempts have been made in the past to replace such crimped and brazed assemblies of rubber hoses and aluminum connecting tubes conventionally used in air-conditioning lines, with thermoplastic structures devoid of metal parts, such as thermoplastic tubes or connectors.

U.S. Pat. No. 10,023,695 B2 relates to a thermoplastic structure comprising at least one layer consisting of a composition comprising a copolyamide of formula X/10.T/Y, wherein:

- X represents either the residues of an aliphatic amino acid comprising between 8 and 18 carbon atoms, or a lactam, or the unit $X_1{\cdot}X_2$ representing the residues resulting from the condensation of an aliphatic diamine comprising between 6 and 18 carbon atoms and a (cyclo)aliphatic diacid comprising between 6 and 18 carbon atoms;
- 10·T represents the residues resulting from the condensation of a decanediamine and terephthalic acid; and
- Y represents the residues resulting from the condensation of an aliphatic diamine comprising between 9 and 14 carbon atoms and an aromatic diacid, Y being different from the unit 10·T;
- the molar proportion of 10·T units in the copolyamide being higher than 0%;
- the molar proportion of Y units in relation to the group of 10·T and Y units being between 0 and 30%; and
- the proportion of X units being between 0.4 and 0.8 mole for a mole of semi-aromatic units 10·T and Y.

U.S. Pat. No. 9,102,828 B2 relates to a composition including:

- 45 to 95 wt % of a semi-aromatic copolyamide containing at least two separate units having the following general formulation: A/X·T, where A is selected from among a unit obtained from an amino acid, a unit obtained from a lactam, and a unit having the formula (diamine Ca)·(diacid in Cb), and XT denotes a unit obtained from the polycondensation of a diamine in Cx and from terephthalic acid, with x being the number of carbon atoms of the diamine in Cx, said copolyamide having a polymolecularity index, noted Ip, of less than or equal to 3.5, measured by gel permeation chromatography, and an amino chain end content of between 0.020 meg/g and 0.058 meg/g; and
- 5 to 55 wt % of at least one cross-linked polyolefin.

SUMMARY OF THE INVENTION

One aim of the present invention is to provide a novel thermoplastic composition capable of forming a monolayer tube for transporting a fluid, which makes it possible to confer on the tube a very low permeation value for water and for a refrigerating fluid in an air-conditioning line, together with satisfactory mechanical and chemical properties even after thermal and chemical ageing, including an improved impact resistance.

This aim is achieved in that the Applicant Company has just unexpectedly discovered that if more than 20% and up to 40% of PA 6.10 or PA 6.12 is combined to from 45% to less than 60% of a specific polyphthalamide selected from PA 6.1/6.T, PA 9.T, PA 10.T, PA 10.T/X and from 10% to 20% of a compatibilizing system predominantly comprising in weight a polyolefin including an unsaturated epoxide and in minority a polyolefin including an unsaturated carboxylic acid, then it is possible to obtain a satisfactory trade-off of improved properties for the thermoplastic monolayer tube and for an entirely thermoplastic air-conditioning tubing line incorporating such tubes for example of a low-pressure loop, as explained below.

More specifically, a thermoplastic composition according to the invention is capable of forming a monolayer tube for transporting a fluid, the monolayer tube being in particular adapted for transporting a refrigerant gas in an air-conditioning circuit of a motor vehicle, wherein the thermoplastic composition comprises in weight fractions:

more than 20% and up to 40% of a PA 6.10 and/or a PA 6.12 as at least one aliphatic polyamide, from 45% to less than 60% of at least one polyphthalamide having a glass transition temperature higher than 120° C. and selected from the group consisting of PA 6.1/6.T, PA 9.T, PA 10.T, PA 10.T/X and mixtures thereof, where X represents at least one polyamide unit other than PA 10.T derived from an aliphatic diamine having from 6 to 9 carbon atoms and from an aromatic dicarboxylic acid comprising terephthalic or isophthalic acid, and from 10% to 20% of a compatibilizing system comprising a product of a reaction between (a) a polymer of at least one first olefin comprising an unsaturated epoxide and (b) a polymer of at least one second olefin comprising an unsaturated carboxylic acid, with a weight ratio (a):(b) greater than 1, said at least one second olefin being identical to or different from said at least one first olefin.

DETAILED DESCRIPTION OF THE INVENTION

It is to be noted that a thermoplastic composition of the invention thus allows to exhibits a very low permeation for the refrigerating gas and for water, as well as very satisfactory mechanical and chemical properties even after thermal and chemical ageing, including an improved impact resistance.

Specifically and as explained below, a thermoplastic composition of the invention at least allows to:

minimize the water permeability thereof, measured for a monolayer tube made of this composition according to PSA standard D45 1729/--A during 288 hours at 70° C. and 95% RH, which water permeability may advantageously be lower than 8.00 $g/m^2/72$ h and even lower than or equal to 7.60 $g/m^2/72$ h, and at the same time allow to provide a high enough burst resistance measured for a monolayer tube made of this composition in a conditioned enclosure according to ISO 1110 standard, which burst resistance may be greater than 6.0 MPa at 23° C. and greater than 3.0 MPa at 125° C., and even greater than 7.0 MPa at 23° C. and greater than 3.3 MPa at 125° C., and/or minimize the permeability thereof to a refrigerant gas consisting of 2,3,3,3-tetrafluoropropene (R-1234yf), measured for a monolayer tube made of this composition according to PSA standard D 451714, which permeability may be lower than 5.00 $g/m^2/72$ h and even lower than 3.00 $g/m^2/72$ h.

It will also be noted that these very advantageous properties of a thermoplastic composition of the invention particularly allow to use the same in an entirely thermoplastic air-conditioning tubing line incorporating thermoplastic tubes (preferably monolayer tubes) for example of in a low-pressure loop, thus replacing the metal-rubber structures conventionally used in such an air-conditioning line.

As explained above, it will further be noted that these advantageous properties of a thermoplastic composition of the invention also allow to use the same in an entirely thermoplastic tubing line involving requirements against gas and/or water permeation, such as in air or fuel lines, for instance.

The term "aliphatic polyamide" is understood to mean in a known way in the present description a homopolymer or copolymer polyamide obtained by reaction of at least one linear, branched or alicyclic diamine and of at least one aliphatic dicarboxylic acid which may also be linear, branched or alicyclic.

Both PA 6.10 and PA 6.12 each included in said at least one aliphatic polyamide are semi-crystalline polyamides derived from a linear diamine having 6 carbon atoms and from a linear dicarboxylic acid having 10 or 12 carbon atoms, respectively.

Preferably, said at least one aliphatic polyamide is devoid of PA 6, being more preferably devoid of PA 6 and also of PA 4.6, PA 6.6, PA 10.10, PA 10.6, PA 11 and of PA 12.

In a preferred example of the invention, said at least one aliphatic polyamide comprises a PA 6.12 and preferably consists of said PA 6.12.

In an alternative example of the invention, said at least one aliphatic polyamide comprises a PA 6.10 and preferably consists of said PA 6.10.

The term "polyphtalamide»(sometimes referred to as PPA) is understood to mean in a known way in the present description, according to ASTM D5336 standard, a polyamide where 55% or more moles of the dicarboxylic acid portion of the repeating unit in the polymer chain is composed of a combination of terephthalic (TPA) and isophthalic (IPA) acids. Thus, a polyphthalamide which is knowingly called a "semi-aromatic" polyamide, is obtained by reaction of at least one linear, branched or alicyclic diamine and of at least one aromatic dicarboxylic acid.

Said at least one polyphthalamide of the invention may be:

semi-crystalline, being by definition such that said dicarboxylic acid portion contains a molar ratio of IPA of at most 55% (preferably of 0-50% and more preferably of 0%, i.e. without IPA), the at least one PPA being then selected from PA 9.T, PA 10.T and PA 10.T/X, or amorphous, being by definition such that said dicarboxylic acid portion contains a molar ratio of IPA of more than 55%, the at least one PPA being then PA 6.1/6.T.

It may be noted that the relatively high amount of said at least one polyphthalamide having a glass transition temperature which is higher than 120° C. (advantageously of at least 122° C., for example of about 125° C.) allows to "frozen" the polymeric chains in the thermoplastic composition and thereby contributes to minimize the water permeability of this composition of the invention by reducing both the water solubility and diffusivity of the composition at a testing temperature of 70° C.

The glass transition temperature Tg of said at least one polyphthalamide may be measured by differential scanning calorimetry ("DSC") or by another conventional technique, such as dynamic mechanical analysis ("DMA").

In an embodiment of the invention, said at least one polyphthalamide comprises a PA 6.1/6.T having said glass transition temperature preferably higher than 122° C., and may advantageously consists of said PA 6.1/6.T.

According to this embodiment, the PA 6.1/6.T may exhibit a molar ratio PA 6.1/PA 6.T of between 1.5 and 2.5, inclusively, and preferably between 1.8 and 2.2 (i.e. with an IPA/TPA molar ratio of about 2.0).

Also according to this embodiment and optionally in combination with said molar ratio PA 6.1/PA 6.T values, the PA 6.1/6.T may have:

a Tg of between 122 and 128° C., inclusively, a relative viscosity (i.e. viscosity ratio) of between 1.40 and 1.70, inclusively, and preferably of between 1.50 and 1.60, and/or a density of between 1.10 and 1.25 $g/cm^3$, inclusively, measured according to ISO 1183 standard.

Also according to this embodiment, a thermoplastic composition of the invention which comprises a mixture PA 6.10 or PA 6.12 (each being semi-crystalline)+PA 6.1/6.T (amorphous), is in a form of separated phases.

Each of the above mentioned techniques of DCS and DMA established indeed that the low mutual affinity between PA 6.10 or PA 6.12 and PA 6.1/6.T leads to this separation of phases in this composition of the invention.

In another embodiment of the invention, said at least one polyphthalamide comprises at least one PA 10.T/X having said glass transition temperature preferably higher than 122° C., and may advantageously consists of said at least one PA 10.T/X.

It may be noted that said PA 10.T/X by definition derives from 1,10-decamethylene diamine and terephthalic acid for the 10.T units, and that X derives from an aliphatic diamine having from 6 to 9 carbon atoms and preferably from terephthalic acid (i.e. not from isophthalic acid).

More preferably, X represents a PA 6.T unit or a PA 6.3.T unit, even more preferably with a molar ratio PA 10.T/X greater than 1.

According to said another embodiment, said at least one polyphthalamide may have a Tg of between 122 and 128° C., inclusively, and may be for example

- a PA 10T/PA 6T, with a molar ratio PA 10T:PA 6T of between 8 and 10 inclusively, and preferably of between 8.5 et 9.5; or
- a PA 10T/PA 6-3-T, with a molar ratio PA 10T:PA 6-3-T of between 1.1 and 10 inclusively, in this case preferably being
- a PA 10T/PA 6-3-T of number average molecular weight Mn measured by GPC of between 10000 and 12000 g/mol, more preferably between 10700 and 11700 g/mol, with said molar ratio PA 10T:PA 6-3-T of between 1.2 and 2, inclusively, of between 1.3 and 1.7; or
- a PA 10T/PA 6-3-T of number average molecular weight Mn measured by GPC of between 12000 and 14000 g/mol, more preferably between 12500 and 13500 g/mol, with said molar ratio PA 10T:PA 6-3-T of between 8 and 10, inclusively, and more preferably between 8.5 and 9.5.

Also according to said another embodiment, a thermoplastic composition of the invention which comprises a mixture PA 6.10 or PA 6.12+PA 10.T/X (all being semi-crystalline), is in a form of mixed phases, not separated phases, as established by the above mentioned techniques of DCS or DMA.

By "compatibilizing system comprising a product of a reaction between the polymers (a) and (b)", it is to be understood in the present description that this system comprises a combination of compounds (a) and (b) as well as the reaction product thereof with said at least one aliphatic polyamide and said at least one polyphthalamide, that said system compatibilizes together.

According to a preferred embodiment of the invention common to all the preceding features thereof, said weight ratio (a):(b) in the compatibilizing system is of from 1.5:1 to 3:1 and preferably of from 1.7:1 to 2.3:1.

By way of the polymer (a) comprising an unsaturated epoxide, mention may be made of all homopolymers or copolymers of said at least one first olefin in which the unsaturated epoxide has been introduced either by grafting or by copolymerization.

The unsaturated epoxide may in particular be selected from aliphatic glycidyl esters and ethers, and alicyclic glycidyl esters and ethers.

Preferably, (a) is a polymer of said at least one first olefin comprising an aliphatic or alicyclic glycidyl ester.

Also preferably, (a) is a copolymer of said at least one first olefin and of said unsaturated epoxide, and more preferably (a) is an olefin-glycidylmethacrylate copolymer.

Generally speaking, (a) may be a homopolymer or copolymer comprising said at least one first olefin units, which are preferably derived from ethylene and/or alpha-olefins including propylene and butene-1.

(a) may be derived from a polyolefin for example selected from polyethylene, polypropylene, ethylene-propylene copolymers, ethylene-propylene rubbers (EPM), ethylene-propylene-diene rubbers (EPDM), copolymers of ethylene and alkyl(meth)acrylate, and copolymer of ethylene and vinyl acetate.

Still more preferably, (a) is an olefin-glycidylmethacrylate copolymer, such as an ethylene-glycidylmethacrylate copolymer.

By way of said at least one polyolefin comprising an unsaturated carboxylic acid forming the compound (b), mention may be made of all homopolymers or copolymers of said at least one second olefin in which the unsaturated carboxylic has been introduced either by grafting or by copolymerization.

Preferably, (b) is a polymer of said at least second olefin comprising (meth)acrylic acid groups, and is preferably an olefin-acrylic acid copolymer.

Generally speaking, (b) may be a homopolymer or copolymer comprising said at least one second olefin units, which are preferably derived from ethylene and/or alpha-olefins including propylene and butene-1 and may be identical to said at least one first olefin units.

(b) may be derived from a polyolefin for example selected from polyethylene, polypropylene, ethylene-propylene copolymers, copolymers of ethylene and alkyl(meth) acrylate, and copolymer of ethylene and vinyl acetate.

More preferably, (b) is an ethylene-(meth)acrylic acid copolymer, and is even more preferably a copolymer of ethylene with acrylic acid groups.

According to an aspect of the invention, the thermoplastic composition may be devoid of a polymer comprising an unsaturated carboxylic anhydride, being in particular advantageously devoid of a copolymer of an olefin and an unsaturated carboxylic anhydride and of a polyolefin grafted with an unsaturated carboxylic anhydride.

According to another aspect of the invention, the thermoplastic composition may be devoid of an elastomer, being in particular advantageously devoid of a polyamide elastomer, of an olefinic elastomer such as an ethylene acrylate elastomer or an ethylene-alpha olefin copolymer, and of a styrenic rubber.

According to still another aspect of the invention, the thermoplastic composition may be devoid of additional filler or fiber.

A thermoplastic composition according to the invention thus preferably consists of said at least one aliphatic polyamide, said at least one polyphthalamide and said compatibilizing system.

According to a preferred embodiment of the invention which may be common to all the preceding features thereof, the thermoplastic composition comprises in weight fractions:

- from 25% to 35% (preferably from 27% to 33%) of said at least one aliphatic polyamide,
- from 50% to 59% (preferably from 53% to 57%) of said at least one polyphthalamide, and from 12% to 18% (preferably from 13% to 17%) of said compatibilizing system.

According to another aspect of the invention which may be common to part or all of the above features thereof, the thermoplastic composition may have:

an initial Young modulus and an initial stress at rupture both measured according to ISO 527 standard after 168 h at 23° C., 50% HR and with a traction speed of 50 mm/min, and a final Young modulus and a final stress at rupture measured after thermal ageing according to ISO 527 standard after 168 h at 150° C. and with a traction speed of 50 mm/min, the variation in absolute value between said final Young modulus and said initial Young modulus and/or between said final stress at rupture and said initial stress at rupture being advantageously lower than 50%.

These features witness satisfactory flexibility and mechanical properties of the compositions and of the monolayer tubes made of the same.

According to another aspect of the invention which may be common to part of all of the above features thereof, the thermoplastic composition may have:

an initial Charpy breaking energy measured according to ISO 179/1eA standard, and a final Charpy breaking energy measured according to ISO 179/1eA standard after thermal ageing after 168 h at 150° C., the variation in absolute value between said final Charpy breaking energy and said initial Charpy breaking energy being advantageously lower than 50%.

This feature witnesses a low variation of impact properties after ageing for a thermoplastic composition of the invention.

A monolayer tube according to the invention is for transporting a fluid, the monolayer tube being in particular adapted for transporting a refrigerant gas in an air-conditioning circuit of a motor vehicle, and the monolayer tube is made of a thermoplastic composition as defined above for the invention.

Advantageously, a monolayer tube of the invention has a water permeability, measured according to PSA standard D45 1729/--A during 288 hours at 70° C. and 95% RH, which may be lower than 8.00 $g/m^2/72$ h and which is preferably lower than or equal to 7.60 $g/m^2/72$ h.

It is to be noted that such an extremely low water permeability is much lower than those obtained for a monolayer tube made of a thermoplastic composition not based on the combination according to the invention of PA 6.10 or PA 6.12 with said at least one polyphthalamide according to the above-specified weight fraction ranges. Moreover, such an extremely low water permeability is also much lower than those obtained for a monolayer tube exclusively made of a pure PA 6.10 or PA 6.12 polyamide.

Also advantageously, the monolayer tube of the invention has a burst resistance measured in a conditioned enclosure according to ISO 1110 standard which may be greater than 6.0 MPa at 23° C. and greater than 3.0 MPa at 125° C., and preferably which is greater than 7.0 MPa at 23° C. and greater than 3.3 MPa at 125° C.

These properties witness a satisfactory resistance to burst for the monolayer tube even at a high temperature, close to those used in operation of a low-pressure loop for an air-conditioning circuit for a motor vehicle.

Also advantageously, the monolayer tube of the invention has a permeability to a refrigerant gas consisting of 2,3,3,3-tetrafluoropropene (R-1234yf), measured according to PSA standard D 451714, which may be lower than 5.00 $g/m^2/72$ h, preferably lower than 3.00 $g/m^2/72$ h and more preferably lower than 2.00 $g/m^2/72$ h.

Such a very low permeability to R-1234yf is fully satisfactory for a low-pressure loop of an air-conditioning circuit for a motor vehicle.

An air-conditioning circuit for a motor vehicle according to the invention comprises a plurality of tubes adapted to transport a refrigerating fluid, the air conditioning circuit comprising a low-pressure loop which comprises low-pressure tubes and a high-pressure loop which comprises high-pressure tubes, wherein at least one of said tubes, selected from the low-pressure tubes and the high-pressure tubes and combinations thereof, comprises a monolayer tube of the invention as defined above.

Said low-pressure loop may be defined between an evaporator and blower assembly and an inlet of a compressor, and said high-pressure loop may be defined between an outlet of the compressor and an expansion valve, between which may be provided in succession a condenser and fan assembly and a drier.

According to an embodiment of the invention, said low-pressure tubes each consist of a said monolayer tube and are connected to one another by thermoplastic connectors devoid of metal parts to form an entirely thermoplastic low-pressure tubing line.

A method according to the invention for preparing the thermoplastic composition defined above comprises kneading said at least one aliphatic polyamide, said at least one polyphthalamide and said compatibilizing system preferably in a twin-screw extruder, to perform a crosslinking chemical reaction for said at least one aliphatic polyamide and said at least one polyphthalamide, by said at least one polyolefin comprising an unsaturated epoxide.

Said compatibilizer system may be introduced in the twin-screw together with said at least one aliphatic polyamide and said at least one polyphthalamide, or alternatively the compatibilizer system may be subsequently introduced on a side feeder, for example near the middle of the extruder so as to reduce the duration of the reaction between this system and the two other components of the composition.

BRIEF DESCRIPTION OF DRAWINGS

FIG. 1 is a diagrammatic perspective view of a typical air-conditioning circuit for a motor vehicle which may incorporate thermoplastic monolayer tubes according to the invention.

FIG. 2 is a perspective partial view of an example of a low-pressure tubing line of the invention usable in the air-conditioning circuit of FIG. 1, the low-pressure line incorporating thermoplastic monolayer tubes according to the invention.

FIG. 3 is a graph showing the respective evolutions over temperature T (° C.) of the storage modulus G' (Pa), of the loss modulus G" (Pa) and of tan delta measured for a composition C9 not according to the invention and for two compositions according to the invention I1 and I2, all in the form of separated phases.

FIG. 4 is a graph showing the respective evolutions over temperature T (° C.) of the storage modulus G' (Pa), loss modulus G" (Pa) and tan delta measured for a composition C7 not according to the invention and for a composition according to the invention I3, both in the form of mixed phases.

EMBODIMENTS OF THE INVENTION

The air-conditioning circuit 1 for a motor vehicle of FIG. 1 comprises a plurality of tubes adapted to transport a refrigerating fluid F, the air conditioning circuit 1 comprising a low-pressure loop 2 which comprises low-pressure tubes and a high-pressure loop 3 which comprises high-pressure tubes.

in the example of FIG. 1, the low-pressure loop 2 is defined between an evaporator and blower assembly 4 and an inlet 5*a* of a compressor 5, and the high-pressure loop 3 is defined between an outlet 5*b* of the compressor 5 and an expansion valve 6 which it itself part of the low-pressure loop 2. In a usual manner, a condenser and fan assembly 7 and a drier 8 are provided in succession in the high-pressure loop 3 between the compressor outlet 5*b* and the expansion valve 6 (the refrigerating fluid being gaseous between the compression outlet 5*b* and condenser 7 and usually liquid between the condenser 7 and expansion valve 6).

According to an embodiment of the invention, at least one of the tubes of the air-conditioning circuit 1 in the low-pressure loop 2 and/or the high-pressure loop 3 and, preferably, at least the low-pressure loop 2 comprises a thermoplastic tubular structure 2*a* made of at least one thermoplastic composition according to the invention, such as the tubular structure 2*a* visible in the example of FIG. 2.

The thermoplastic tubular structure 2*a* may advantageously consist of a plurality of thermoplastic monolayer tubes T1, T2, etc. assembled to together in succession in the loop 2, 3 and are connected to one another by thermoplastic connectors C1, C2, etc. As a consequence, the thermoplastic tubular structure 2*a* may advantageously be used to form an entirely thermoplastic tubing line in the low-pressure loop 2 and/or high pressure loop 3, in contrast to the conventional tubing lines involving rubber and metal tube sections.

As demonstrated in the below examples, such a thermoplastic tubular structure 2*a* made of a thermoplastic composition of the invention may exhibit a remarkable trade-off of improved properties rendering it particularly suitable for forming such a thermoplastic tubing line in the low-pressure loop 2.

EXAMPLES

Tested Compositions

A number of thermoplastic control compositions C1-C12 and of thermoplastic compositions according to the invention I1-I3 were prepared by kneading, in a twin-screw extruder "Leistritz" of ZSE40MAXX type (L/D=44) for compositions C1-C9, C12 and I1-I3 and in a twin screw extruder "Leistritz" of ZSE18MAXX type (L/D=40) for compositions C10-C11, a polyamide mixture of a PA 6.12 (optionally combined to PA 6 for some control compositions) and of a PA 6.1/6.T or a PA 10.T/X in the presence of a compatibilizing system to crosslink this mixture. The compatibilizing system was introduced in each twin-screw together with this polyamide mixture.

The polyamides tested in these compositions were as recited below:

PA 6.12: Grilamid® XE 4155 black 9992, from EMS-GRIVORY

PA 6: Akulon® F136DH, from DSM

PA 6.1/6.T: Grivory® G21 6506, from EMS-GRIVORY

PA 10.T/X "M3000": Vestamid® HT plus M3000, from EVONIK

PA 10.T/X "HT3Z": Grivory® HT3Z, from EMS-GRIVORY.

Chem. 1 represents the semi-structural chemical formula for PA 10.T/X «M3000», obtained by RMN $^1$H analysis with X=PA 6-3-T. Hence, PA 10.T/X "M3000" is a PA 10.T/PA 6.3.T. The RMN H analysis disclosed a molar ratio block PA 10.T:block PA 6.3.T of 90:10 (±5% uncertainty). The number-average molecular weight Mn of this PA 10.T/PA 6.3.T was 13000 g/mol by GPC, which gave a number average polymerization degree (PDn) of 38.7 pour the blocks PA 10.T and of 4.5 pour the blocks PA 6.3.T.

[Chem. 1]

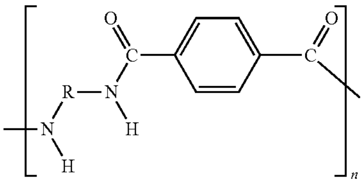

PA10T: R = 10

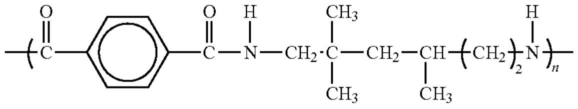

PA 6-3-T

Chem. 2 represents the semi-structural chemical formula for PA 10.T/X «HT3Z», obtained by RMN H analysis with X=PA 6.T. Hence, PA 10.T/X "M3000" is a PA 10.T/PA 6.T. The RMN $^1$H analysis disclosed a molar ratio block PA 10T:block PA 6.T of 90:10 (±5% uncertainty).

[Chem. 2]

[Chem. 2]

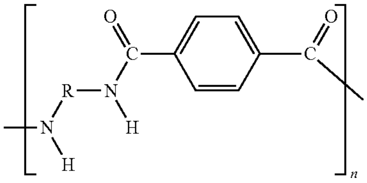

PA10T: R = 10

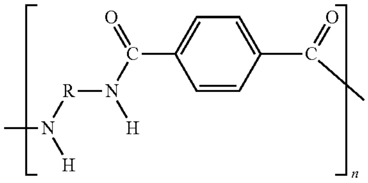

PA6T: R = 6

The compatibilizing system tested in these compositions consisted of the two following compounds (a) and (b) detailed below.

(a) PE-GMA: Lotader® AX8840, from ARKEMA: a random copolymer of ethylene and glycidyl methacrylate, polymerized by high-pressure autoclave process, and (b) PE-AA: Primacor® 1410, from DOW: an ethylene-acrylic acid copolymer.

In compositions of the invention, and the weight ratio (a):(b) was of 2:1.

Tables 1 and 2 below detail the formulations and process parameters of the tested compositions, respectively of control compositions C1-C8 in table 1 and of control compositions C9-C12 and compositions of the invention I1-I3 in table 2.

TABLE 1

| | C1 | C2 | C3 | C4 | C5 | C6 | C7 | C8 |
|---|---|---|---|---|---|---|---|---|
| Compositions (weight fractions) | | | | | | | | |
| PA6 Akulon F136-DH | 60 | 45 | 0 | 25 | 25 | 0 | 0 | 0 |
| PA 6.12 GrilamidXE4155 | 25 | 25 | 25 | 0 | 30 | 25 | 42.5 | 40 |
| PA 6.I/6.T Grivory G21 | 0 | 0 | 60 | 60 | 30 | 45 | 0 | 60 |
| PA 10.T/X Vestamid HT plus M3000 | 0 | 15 | 0 | 0 | 0 | 15 | 50 | 0 |
| PA 10.T/X Grivory HT3Z | 0 | 0 | 0 | 0 | 0 | 0 | 0 | 0 |
| PE-GMA LotaderAX8840 | 10 | 10 | 10 | 10 | 10 | 10 | 5 | 0 |
| PE-AA Primacor 1410 | 5 | 5 | 5 | 5 | 5 | 5 | 2.5 | 0 |
| Twin screw extruder | | | | | | | | |
| Screw speed (rpm) | 280 | 260 | 260 | 260 | 260 | 260 | 260 | 260 |
| Flow rate (kg/h) | 60 | 60 | 75 | 75 | 75 | 75 | 80 | 75 |
| Power (%) | 68 | 61 | 67 | 65 | 72 | 61 | 65 | 64 |
| Melt temperature (° C.) | 253 | 243 | 262 | 267 | 263 | 264 | 289 | 272 |
| Melt pressure (bar) | 140 | 125 | 113 | 94 | 105 | 103 | 91 | 91 |

TABLE 2

| | C9 | C10 | C11 | C12 | I1 | I2 | I3 |
|---|---|---|---|---|---|---|---|
| Compositions (weight fractions) | | | | | | | |
| PA 6 Akulon F136-DH | | | | 15 | | | |
| PA 6.12 GrilamidXE4155 | 25 | 42.5 | 50 | 15 | 40 | 30 | 30 |
| PA 6.I/6.T Grivory G21 | 60 | 47.5 | 45 | 55 | 45 | 55 | |
| PA 10.T/X Vestamid HT plus M3000 | | | | | | | 40 |
| PA 10.T/X Grivory HT3Z | | | | | | | 15 |
| PE-GMA Lotader AX8840 | 10 | 6.7 | 3.3 | 10 | 10 | 10 | 10 |
| PE-AA Primacor 1410 | 5 | 3.3 | 1.7 | 5 | 5 | 5 | 5 |
| Twin screw extruder | | | | | | | |
| Screw speed (rpm) | 260 | 500 | 500 | 400 | 260 | 400 | 400 |
| Flow rate (kg/h) | 75 | 6 | 6 | 100 | 75 | 100 | 100 |
| Power (%) | 64 | 70 | 70 | 65 | 68 | 66 | 81 |
| Melt temperature (° C.) | 275 | 280 | 280 | 262 | 276 | 260 | 295 |
| Melt pressure (bar) | 116 | 50 | 50 | 106 | 142 | 116 | 90 |

FIG. 3 shows the evolutions over temperature of the storage modulus G', loss modulus G" and tan delta for control composition C9 and compositions I1 and I2 of the invention which each comprise separated phases due to the crystalline PA 6.12 and the amorphous PA 6.1/6.T, illustrating the advantageous technical effect of using a PPA having a high Tg in compositions I1 and I2 (see the temperature of 120° C.) which comprise 45% and 55% of this PPA with only 40% and 30% pf PA 6.12, respectively. FIG. 3 shows that a high weight ratio of a high Tg PPA imparts a strong peak at the high temperature of 120° C. to a composition of the invention, while a low weight ratio of the high Tg PPA leads to a weak peak at this high temperature.

FIG. 4 also shows the comparative evolutions over temperature of the storage modulus G', loss modulus G" and tan delta for both thermoplastic composition C7 and I3, which each comprise a fully semi-crystalline mixture PA 6.12+PA 10.T/X in a form of mixed phases.

Tables 3 and 4 below both detail the following properties of the tested compositions.

Mechanical properties were measured at 23° C. with HR=50%, according to ISO 527 for the Young modulus and the stress at rupture (or the yield stress) in table 3, and according to ISO 178 for the flexion modulus in table 4.

Charpy breaking energy in table 3 was measured according to ISO 179/1eA.

Thermal ageing in table 3 was carried out after 168 h at 150° C., and a traction speed of 50 mm/min. was used.

Burst resistance in table 3 was measured according to ISO 1110 in a conditioned enclosure at 23° C. and 125° C.

Permeability to water of the monolayer tubes in table 3 was measured according to PSA standard D45 1729/--A during 288 hours at 70° C. and 95% RH.

Permeability to R-1234yf of the monolayer tubes in table 3 was measured according to PSA standard D 451714.

Flexion properties recited in table 4 were measured in dry state at 23° C., and after conditioning according to ISO 1110 standard, with different thicknesses (3 mm and 5 mm) for the tested monolayer tubes and at different HR (%).

Further, chemical ageing of compositions I1-I3 due to oils was measured during 2000 h at 110° C., in the oils known under the names ND12, SPA2, HD100, VC200YF, VC100YF, ND8, PSR-1, PSD1, YR20, ND11, ZXL100PG and ZXL200PG. No significant variations were measured after contact with these oils for the above mechanical properties, particularly including the Young modulus and the stress at rupture.

Furthermore, the resistance of compositions I1-I3 to $ZnCl_2$ was measured according to D 471011 standard by immersion in $ZnCl_2$ of monolayer tubes made of compositions I1-I3 during 1 min. at 23° C. followed by dry heating during 3 h at 80° C. This test resulted in no change of aspect for these tubes made of compositions I1-I3.

Specifically according to D47 1011 standard, the samples were immersed so that the whole fir tree or snap-in interface/pipe was in contact with the liquid ($ZnCl_2/CaCl_2$=20%/80%). The samples were kept in the position without shaking for 1 minute+/−5 seconds. The samples were placed horizontally in the oven at 80° C. for 3 hours+/−5 minutes. 2 cycles were performed per day. At the end of each day, the samples that must be validated were left for a maximum of 20 hours at room temperature under a fume cupboard before starting a new cycle. The samples were immersed in the solution 4 cycles minimum to reach a rating of 5.

TABLE 3

| | Mechanical properties after thermal ageing (variations: %) | | | Burst resistance (MPa) | | Permeability to water | Permeability to R-1234yf |
|---|---|---|---|---|---|---|---|
| | Acceptable if variation <50% | | | 23° C. | 125° C. | ($g/m^2$/72 h) | ($g/m^2$/72 h) |
| | Modules variation | Stress variation | Charpy variation | Acceptable if >6 MPa | Acceptable if >3.4 MPa | Maximum value | Maximum value |
| C1 | −0.3 | 3.8 | −3.0 | 5.8 | 3.0 | 37.90 | 6.90 |
| C2 | 4.2 | −4.0 | 19.0 | 7.3 | 3.5 | 23.90 | 4.90 |
| C3 | 29.7 | 32.7 | −58.0 | | | 3.85 | |
| C4 | Not acceptable | Not acceptable | Not acceptable | 7.5 | 2.5 | 5.55 | 1.65 |

TABLE 3-continued

| | Mechanical properties after thermal ageing (variations: %) | | | Burst resistance (MPa) | | Permeability to water | Permeability to R-1234yf |
|---|---|---|---|---|---|---|---|
| | Acceptable if variation <50% | | | 23° C. | 125° C. | ($g/m^2/72$ h) | ($g/m^2/72$ h) |
| | Modules variation | Stress variation | Charpy variation | Acceptable if >6 MPa | Acceptable if >3.4 MPa | Maximum value | Maximum value |
| C5 | 32.5 | −5.4 | −40.0 | 6.0 | 2.5 | 11.60 | 3.30 |
| C6 | 43.0 | 17.3 | −62.0 | 6.0 | 2.5 | 3.80 | 8.40 |
| C7 | −4.0 | 13.8 | −25.0 | 6.0 | 3.4 | 4.67 | |
| C8 | 20.0 | 28.0 | −45.0 | 7.1 | 3.4 | 6.35 | 2.25 |
| C9 | 11.0 | 26.0 | −59.0 | 6.9 | 3.4 | 5.93 | 6.15 |
| C10 | 30.0 | 9.0 | −18.0 | | | | |
| C11 | 40.0 | 12.0 | −53.0 | | | | |
| C12 | 73.0 | 14.0 | −67.0 | acceptable | acceptable | 8.14 | acceptable |
| I1 | 16.0 | 15.0 | −15.0 | 7.35 | 3.4 | 10.45 | 3.05 |
| I2 | 32.0 | 14.0 | −27.0 | 9.1 | acceptable | 7.55 | 0.00 |
| I3 | 12.0 | −2.0 | 1.0 | 6 (flange leak) | 3.4 | 7.15 | 0.50 |

TABLE 4

| | Flexion modulus M (MPa) | | | | | | | |
|---|---|---|---|---|---|---|---|---|
| | Dry 3 mm | Dry 5 mm | Con-ditioned 3 mm | Con-ditioned 5 mm | ΔM (%) at 3 mm | ΔM (%) at 5 mm | HR (%) | Dynamic stiffness L-shaped test tube |
| C1 | 348 | 528 | 140 | 217 | −60 | −59 | 2.05 | |
| C2 | | | | | | | | |
| C3 | | | | | | | | |
| C4 | 577 | 915 | 588 | 918 | +2 | 0 | 2.0 | |
| C5 | 449 | 700 | 376 | 571 | −16 | −18 | 1.5 | |
| C6 | 465 | 732 | 489 | 772 | +5 | +6 | 1.2 | |
| C7 | 443 | 714 | 434 | 686 | −2 | −4 | 1.0 | |
| C8 | 551 | 871 | 515 | 804 | −7 | −8 | 2.2 | |
| C9 | 415 | 654 | 411 | 644 | −1 | −2 | 1.0 | |
| C10 | | | | | | | | |
| C11 | | | | | | | | |
| C12 | 457 | 725 | 457 | 711 | 0 | −2 | 1.6 | |
| I1 | 370 | 572 | 346 | 534 | −7 | −7 | 1.9 | ± |
| I2 | 414 | 640 | 398 | 620 | −4 | −3 | 1.4 | |
| I3 | 411 | 647 | 365 | 567 | −11 | −12 | 1.1 | ± |

As a result from all the measured properties recited above, it may be noted the thermoplastic compositions I1, I2 and I3 of the invention exhibit advantageous properties, and that in particular the compositions I2 and I3 exhibit a satisfactory balance of properties including a very low permeation for water and also for a refrigerating gas, as well as very satisfactory mechanical properties even after thermal and chemical ageing, including an improved impact resistance, as witnessed by

- the water permeability of monolayer tubes made of compositions I1-I3 which is lower than 10.50 $g/m^2/72$ h and advantageously lower than 7.60 $g/m^2/72$ h (see compositions I2 and I3 in table 2),
- the R-1234yf permeability of monolayer tubes made of compositions I1-I3 which is lower than 3.10 $g/m^2/72$ h and advantageously lower than 1.00 $g/m^2/72$ h (see compositions I2 and I3 in table 2),
- a variation of mechanical properties after thermal ageing of less than 40% for compositions I1-I3 (and even less than 30%, see I1 and I3 in table 2), and
- an acceptable burst resistance of monolayer tubes made of compositions I1-I3.

These results of compositions of the invention compared to those of control compositions C1-C12 also specifically demonstrate the unexpected and advantageous selection in compositions I1-I3 of:

- more than 20% and up to 40% of PA 6.12 (in view of compositions C7 and C12),
- from 45% to less than 60% of the PPA according to the invention (i.e. PA 6.1/6.T and/or PA 10.T/X, for instance, in view of compositions C3 to C6 and C8 to C9 including either 30% or 60% of PPA(s)), and of
- from 10% to 20% for the compatibilizing system of the invention.

As a conclusion, these examples demonstrate that the compositions of the invention are very advantageously usable in entirely thermoplastic air-conditioning tubing lines incorporating thermoplastic monolayer tubes for example of in a low-pressure loop, in lieu of metal-rubber structures conventionally used therein.

The invention claimed is:

1. A thermoplastic composition capable of forming a monolayer tube for transporting a fluid, wherein the thermoplastic composition comprises in weight fractions:

more than 20% and up to 40% of a PA 6.10 and/or a PA 6.12 as at least one aliphatic polyamide, from 45% to less than 60% of at least one polyphthalamide having a glass transition temperature higher than 120° C. and selected from the group consisting of PA 6.I/6.T, PA 9.T, PA 10.T, PA 10.T/X, where X represents at least one polyamide unit other than PA 10.T derived from an aliphatic diamine having from 6 to 9 carbon atoms and from an aromatic dicarboxylic acid comprising terephthalic or isophthalic acid, and from 10% to 20% of a compatibilizing system comprising a product of a reaction between (a) a polymer of at least one first olefin comprising an unsaturated epoxide and (b) a polymer of at least one second olefin comprising an unsaturated carboxylic acid, with a weight ratio (a):(b) greater than 1, said at least one second olefin being identical to or different from said at least one first olefin.

2. The thermoplastic composition as claimed in claim 1, wherein said at least one aliphatic polyamide is devoid of PA 6.

3. The thermoplastic composition as claimed in claim 1, wherein said at least one aliphatic polyamide comprises a PA 6.12.

4. The thermoplastic composition as claimed in claim 1, wherein said at least one polyphthalamide comprises a PA 6.I/6.T having said glass transition temperature higher than 122° C.

5. The thermoplastic composition as claimed in claim 4, wherein said at least one aliphatic polyamide and said at least one polyphthalamide form separated phases in the thermoplastic composition.

6. The thermoplastic composition as claimed in claim 1, wherein said at least one polyphthalamide comprises at least one PA 10.T/X having said glass transition temperature higher than 122° C., wherein X represents a PA 6.T unit or a PA 6.3.T unit.

7. The thermoplastic composition as claimed in claim 1, wherein in said compatibilizing system, said weight ratio (a):(b) is of from 1.5:1 to 3:1.

8. The thermoplastic composition as claimed in claim 1, wherein in said compatibilizing system, (a) is a polymer of said at least one first olefin comprising an aliphatic or alicyclic glycidyl ester.

9. The thermoplastic composition as claimed in claim 1, wherein in said compatibilizing system, (b) is a polymer of said at least second olefin comprising (meth)acrylic acid groups.

10. The thermoplastic composition as claimed in claim 1, wherein the thermoplastic composition is devoid of a polymer comprising an unsaturated carboxylic anhydride.

11. The thermoplastic composition as claimed in claim 1, wherein the thermoplastic composition is devoid of additional filler or fiber.

12. The thermoplastic composition as claimed in claim 1, wherein the thermoplastic composition has:

an initial Young modulus and an initial stress at rupture both measured according to ISO 527 standard after 168 h at 23° C., 50% HR and with a traction speed of 50 mm/min, and a final Young modulus and a final stress at rupture measured after thermal ageing according to ISO 527 standard after 168 h at 150° C. and with a traction speed of 50 mm/min, the variation in absolute value between said final Young modulus and said initial Young modulus and/or between said final stress at rupture and said initial stress at rupture being lower than 50%.

13. A monolayer tube for transporting a fluid, the monolayer tube adapted for transporting a refrigerant gas in an air-conditioning circuit of a motor vehicle, wherein the monolayer tube is made of the thermoplastic composition as claimed in claim 1.

14. An air-conditioning circuit for a motor vehicle comprising a plurality of tubes adapted to transport a refrigerating fluid, the air conditioning circuit comprising a low-pressure loop which comprises low-pressure tubes and a high-pressure loop which comprises high-pressure tubes, wherein at least one of said tubes selected from the low-pressure tubes and the high-pressure tubes comprises the monolayer tube as claimed in claim 13.

15. The air-conditioning circuit for a motor vehicle according to claim 14, wherein said low-pressure tubes each consist of a said monolayer tube and are connected to one another by thermoplastic connectors devoid of metal parts to form an entirely thermoplastic low-pressure line.

16. A method for preparing the thermoplastic composition as claimed in claim 1, comprising the step of kneading said at least one aliphatic polyamide, said at least one polyphthalamide and said compatibilizing system to perform a crosslinking chemical reaction for said at least one aliphatic polyamide and said at least one polyphthalamide, by said at least one polyolefin comprising an unsaturated epoxide.

17. The thermoplastic composition as claimed in claim 1, wherein said at least one aliphatic polyamide consists of a PA 6.12.

18. The thermoplastic composition as claimed in claim 1, wherein said at least one polyphthalamide consists of a PA 6.I/6.T having said glass transition temperature higher than 122° C.

19. The thermoplastic composition as claimed in claim 1, wherein said at least one polyphthalamide consists of at least one PA 10.T/X having said glass transition temperature higher than 122° C., wherein X represents a PA 6.T unit or a PA 6.3.T unit.

20. The thermoplastic composition as claimed in claim 1, wherein the thermoplastic composition consists of said at least one aliphatic polyamide, said at least one polyphthalamide and said compatibilizing system, and wherein the thermoplastic composition consists of in weight fractions:

from 25% to 35% of said at least one aliphatic polyamide, from 50% to 59% of said at least one polyphthalamide, and from 12% to 18% of said compatibilizing system.

* * * * *